United States Patent [19]

Silverton

[11] Patent Number: 5,274,014

[45] Date of Patent: Dec. 28, 1993

[54] GILSONITE-LIGNOSULPHONATE EMULSION COMPOUND

[76] Inventor: Albert G. Silverton, 1464 N. First Ave., Upland, Calif. 91786

[21] Appl. No.: 33,413

[22] Filed: Mar. 18, 1993

Related U.S. Application Data

[63] Continuation of Ser. No. 782,668, Oct. 25, 1991, abandoned, which is a continuation-in-part of Ser. No. 582,759, Sep. 14, 1990, abandoned.

[51] Int. Cl.$^5$ .................... C08K 3/20; C08L 95/00
[52] U.S. Cl. ........................... 524/60; 524/65; 524/76; 106/123.1; 106/277
[58] Field of Search ............... 524/60, 65, 76; 106/123.1, 277

[56] References Cited

U.S. PATENT DOCUMENTS

| | | | |
|---|---|---|---|
| 1,733,493 | 10/1929 | Kirschbraun . | |
| 2,558,402 | 6/1951 | Wallace | 22/188 |
| 2,730,506 | 1/1956 | Sommer | 252/311.5 |
| 2,738,287 | 3/1956 | Eisenhut et al. | 252/311.5 |
| 2,789,097 | 4/1957 | Rappleyea | 106/123.1 |
| 3,036,015 | 3/1962 | Woodward | 106/277 |
| 3,050,468 | 8/1962 | Wright | 252/311.5 |
| 3,093,500 | 6/1963 | Jones | 260/524 |
| 3,098,094 | 7/1963 | Pitchford | 260/524 |
| 3,230,104 | 1/1966 | Falkenberg et al. | 106/277 |
| 3,276,887 | 10/1966 | Pitchford | 106/277 |
| 3,418,249 | 12/1968 | Pitchford | 252/311.5 |
| 3,427,172 | 2/1969 | Roediger et al. | 106/14 |
| 3,432,321 | 3/1969 | Rostler | 106/277 |
| 3,445,258 | 5/1969 | Ferm et al. | 106/277 |
| 3,592,788 | 7/1971 | Rostler | 260/28.5 |
| 3,738,852 | 6/1973 | Tadashi Doi et al. | 106/277 |
| 3,859,227 | 1/1975 | Dwyer | 106/277 |
| 3,956,002 | 5/1976 | Moorer | 106/277 |
| 4,211,575 | 7/1980 | Burris | 106/274 |
| 4,282,037 | 8/1981 | Burris | 106/277 |
| 4,293,459 | 10/1981 | Detroit | 106/123.1 |
| 4,298,397 | 11/1981 | Burris | 106/274 |
| 4,338,136 | 7/1982 | Goullet et al. | 106/273 |
| 4,427,449 | 1/1984 | Zdybak | 106/277 |
| 4,437,896 | 3/1984 | Partanen | 106/273 |
| 4,492,781 | 1/1985 | Duszak | 524/59 |
| 4,657,948 | 4/1987 | Roark et al. | 524/42 |
| 4,666,522 | 5/1987 | Hollis, Jr. et al. | 106/277 |
| 4,833,184 | 5/1989 | Higgins | 524/60 |

FOREIGN PATENT DOCUMENTS 489432  1/1953  Canada .

OTHER PUBLICATIONS

The Condensed Chemical Dictionary, Tenth Edition; revised by Gessner G. Hawley (p. 17).
Hackh's Chemical Dictionary, Third Edition; by Julius Grant, M. Sc., Ph.D., Frie. (p. 296).
Concise Chemical and Technical Dictionary, Third Enlarged Edition, edited by H. Bennett, F.A.I.C. (p. 702).

*Primary Examiner*—Paul R. Michl
*Assistant Examiner*—LaVonda DeWitt
*Attorney, Agent, or Firm*—Klarquist, Sparkman, Campbell, Leigh & Whinston

[57] ABSTRACT

A stable emulsion of gilsonite, lignosulphonates and acrylic polymers in water.

48 Claims, No Drawings

GILSONITE-LIGNOSULPHONATE EMULSION COMPOUND

This application is a continuation-in-part of application Ser. No. 07/782,668, filed Oct. 25, 1991, now abandoned, which is a continuation-in-part of application Ser. No. 07/582,759, filed Sep. 14, 1990, now abandoned.

FIELD OF THE INVENTION

This invention relates to gilsonite emulsions and particularly to aqueous gilsonite-lignosulphonate emulsions having improved emulsion characteristics.

BACKGROUND OF THE INVENTION

In U.S. Pat. Nos. 4,094,696, 4,073,659, 4,193,815, 4,282,037, 4,621,108 and 4,722,953 there are disclosed gilsonite, asphalt and various other bituminous polymer emulsion compositions. A number of the compositions are effective for paving surfaces, and others for producing coatings, insulation board materials, etc. As useful as these materials are, the instability of the emulsions frequently make such products difficult to use after a period of storage. Shelf life of the prepared emulsions and the ability of the composition to resist deterioration over long periods of use after being applied to a surface and especially when exposed to alternating periods of extreme weather conditions, leave something to be desired. These prior art compositions are formed at elevated temperatures and generally must be applied or used at elevated temperatures. It is to still further improved gilsonite emulsion compositions having superior characteristics as well as a number of other uses that the compositions of the present invention are directed. Heretofore, the gilsonite mixtures have used heat to soften the gilsonite and aromatic and aliphatic organic solvents to solubilize the gilsonite. These solvents are now limited in usage by legislation such as the Clean Air Act. Water base coatings and other products are needed to replace those products which have volatile organic compounds as the solvent or vehicle. It has also been found that the prior art bituminous water emulsions lack the ability to prepare suitable wood stains and printing inks when reduced substantially by addition of water. The unique properties of gilsonite, contrasted with bitumens in general present unique problems in the formation of stable aqueous emulsions. When thinned with water, the prior art emulsion compositions tend to break and separate, rendering them of little value for use as wood stains and printing inks. Prior art emulsions have been formed at elevated temperatures. There is a need to provide a stable and secure emulsification system and method for gilsonite, in part due to the unique properties of this specific category of bitumen.

It has been found that a prior art emulsification system using waste sulfite liquor as the emulsification agent for heat polymerized synthetic bitumen cannot effectively emulsify gilsonite at non-elevated temperatures, and the mixture attempted according to the teachings of the patent disclosing this prior art (U.S. Pat. No. 2,789,097 issued to Mr. Rappleyea) was not able to provide a stable gilsonite-water emulsion when formed and processed at room temperature. Other unmodified asphaltic mixtures using other prior art emulsification and surfactant agents frequently exhibit brittleness. Since there is a need for a relatively high degree of flexibility particularly when the emulsion is applied to printing ink, such compositions cannot be effectively applied to use as printing ink. Chemicals heretofore added to the asphaltic emulsions, include various emulsifiers and dispersants, such as polymers to improve flexibility, extensibility and toughness, emulsifiers to help maintain a more nearly stable emulsion, dispersants, clays, fillers, pigments and other materials added for special purposes. Traditional mixing or blending procedures are used to incorporate the mentioned chemicals into the asphaltic emulsions. The asphalt emulsion known to the prior art find use as road slurry sealers but cannot be used in wood stains and printers ink due to incompatibility with ingredients needed to manufacture such products. Heretofore none of the prior art emulsions have been found effective to provide a refined and stable emulsion of gilsonite for use as wood stains, printing ink, automotive undercoating emulsions and similar applications.

Aqueous bituminous emulsions heretofore known normally consist of emulsifiers such as clays, or combinations of cationic, nonionic or anionic emulsifying agents combined with the bitumen at an elevated temperature. The surface active agents are necessary to provide emulsion stability. After the emulsion particles coalesce, the presence of the surface active agents detracts from water resistant properties. The addition of a polymer emulsion to the asphaltic emulsion enhances the properties of the resulting coating material. However, the resulting film may have some degree of water solubility so that the water resistance of the cured material is adversely affected. There is a need in the industry for a simple emulsification process and composition which results in a highly stable emulsion for storage purposes yet provides advantageous properties for use of the resulting material in applications such as wood stains, water based printing inks and other similar applications. There is also a need in the industry for adhesive emulsions and adhesives made with water reducible resins including gilsonite which have enhanced shear and peel strength. Other well known uses of gilsonite, including asphalt modification, oil drilling cement slurries, paints and the like can benefit from improved emulsion characteristics.

SUMMARY OF THE INVENTION

It is therefore a primary object of this invention to provide a bituminous emulsion preferably made with gilsonite in which a stable aqueous emulsion is formed by the incorporation of refined lignin based emulsification agents.

Another object of this invention is to provide a gilsonite-lignosulphonate emulsion, especially useful in the formation of wood stains, water based printing inks, adhesives, modified asphaltic compositions, oil drilling slurries and the like.

Another object of this invention is to provide a bituminous emulsion in which the emulsification agent or agents are purified lignosulphonate and specifically include certain calcium, sodium and ammonium lignosulphonates.

It is a further object of this invention to provide a gilsonite-lignolsulphonate emulsion which may be easily formed by well known processing techniques at or near room temperature.

The gilsonite emulsion compositions of the present invention comprise a base stock consisting of a blend of gilsonite, water, and a refined lignosulphonate. It has been found that the preferred lignosulphonate for use in this invention include sodium, ammonium or calcium lignosulphonates or oxylignosulphonates having anionic surfactant properties such as a fractionated sodium or calcium salt of oxylignin. An acrylic polymer emulsion may be added to the mixture of gilsonite, water and refined lignosulphonate after appropriate grinding, for example, in a pebble or ball mill, to aid in maintaining the ingredients in a stable dispersion.

To further affect the hiding characteristics and pigmentation properties of the emulsions of this invention, it has been discovered that carbon black can be incorporated into the emulsion by use of a selected refined lignosulphonate in addition to the refined lignosulphonate used in the formation of the gilsonite emulsion. A fractionated sodium salt of oxylignin, such as VANISPERSE CB, produced by Borregaard Chemical Corp. has been found to be effective in forming an emulsion of carbon black. Gilsonite can best be emulsified with a fractionated sodium lignosulphonate such as LIGNOSRM 823, produced by Georgia-Pacific Corp. Without the discovery that different lignosulphonates may advantageously be used to emulsify the carbon black and the gilsonite, the formation of the emulsion incorporating both carbon black and gilsonite was not successful.

DETAILED DESCRIPTION OF THE INVENTION

In the gilsonite base stock composition, gilsonite, water and lignosulphonate are blended at or near room temperature and preferably well below 100 degrees F. in a range of ratios of between about 20-50 parts gilsonite, 20-50 parts water and 10-30 parts lignosulphonate, by weight. The temperature may rise somewhat during the operation of the ball mill but rarely exceeds the range of about 110 to 120 degrees Fahrenheit. Cooling of the mixing apparatus should be contemplated if the temperature exceeds the stated range. Preferably, gilsonite is present in amounts of at least about 40% although smaller amounts of gilsonite may be used, and with the appropriate selection of emulsification agents, carbon black may be incorporated into the emulsion to enhance opacity. The specific ratios of lignosulphonate and gilsonite present in the base stock will depend on the intended use and the desired properties. For example, for wood stain compositions, about 35-40% of gilsonite combined with about 20-30% lignosulphonate and about 35-40% water has been found advantageous and, when incorporated into a suitable stain mixture just before application to the wood surface, provides a stain of superior properties, particularly in appearance and water resistance. A minor percentage, in the range of 10% or less by weight, of an acrylic polymer emulsion such as Rhoplex AC-388, an acrylic copolymer dispersion manufactured by Rohm and Haas Company, Independence Mall West, Philadelphia, Pa. 19105, may also be added to enhance shelf life of the emulsion. For other uses greater amounts of gilsonite may be used. However, such ratios and percentages are only guidelines, and the specific amounts of those materials may be selected as desired within the purview of the invention. Other well known acrylic dispersions widely used in the coatings industries may also be used.

Although high melting point gilsonites may be used in this invention, the gilsonite used is preferably on e having a melting or softening point near about 300 degrees F. so that it may be easily ground in a ball or pebble mill into a smooth dispersion with water and the lignosulphonate. One such gilsonite comprises a "selects" grade, having a nominal melting or softening point above 300 degrees F., usually about 310-320 degrees F. However, other grades of gilsonite may be used including the "brilliant black" grade having a softening point above about 385 degrees F.

The lignosulphonate materials useful in this invention include the various refined sodium, calcium and ammonium lignosulphonates and various of the oxylignins. Lignin is the chief non-carbohydrate constituent of wood, a polymer that functions as a natural binder and support for the cellulosic fibers of wood and plants. The oxylignins derive from spruce wood that have a molecular weight of between 1,000 and 15,000 exhibit the most desirable dispersion and stability characteristics for use with the gilsonite emulsions. The oxylignins found most useful in this process are surface active chemicals characterized as anionic dispersants. The oxylignins are derived from lignin which has been oxidized in a process in which a reduction in sulphur content originally present in the lignosulphonate raw material, together with condensation, cleavage and rearrangement reactions caused by oxidation result in a reduced number of sulfonic and methoxyl groups, and an increase in the number of functional phenolic hydroxyl and carboxylic groups. Waste sulfite liquor, without refinement and separation into the specific lignosulfonate groups mentioned above, does not perform satisfactorily in forming the gilsonite emulsion of this invention.

The oxylignins promote wetting and dispersing of solids without noticeably reducing surface tension. The specific oxylignins found to be most desirable for use in this process are produced by Borregaard Chemical Corporation and are described in the Borregaard Bulletin entitled *Lignin Chemicals Presented By Borregaard-700E*. The surface-active anionic dispersant sold by Borregaard under the trade name of VANISPERSE has proven to be the most desirable oxylignin utilized in this process. Other well known calcium, sodium and ammonium lignosulphonates such as those produced by the American Can Company under the trademarks "MARASPERSE C21" and "N22"; products of Reed Ltd. marketed under the trade name LIGNOSAL such as the ammonium lignosulphonate identified by the trade names "LIGNOSOL TS" and "LIGNOSOL TSF" and "TSD" and sodium lignosulphonate sold under the trade name "LIGNOSOL-X" and "LIGNOSOL XD" and "LIGNOSOL XD-65" may be used. Similarly, other lignosulphonates of the Reed Ltd. company may find use. Georgia Pacific Corporation/Bellingham Division provides sodium lignosulphonate under the trade names "LIGNOSITE 4558" and "LIGNOSITE 823" and "854". A calcium lignosulphonate manufactured by Georgia Pacific/Bellingham Division is marketed under "LIGNOSITE 1840".

In emulsions in which it is desired to incorporate carbon black, a specific lignosulphonate which has been found effective for dispersing the gilsonite is LIGNOSITE 823, produced by Georgia Pacific Corp. A specific lignosulphonate which has been found to be effective in emulsification of the carbon black prior to incorporation thereof into the final mixture is VANISPERSE CB, a product of Borregaard Chemical Corp. It is believed that other lignosulphonates may also be used for this purpose which can easily be determined by simple experimentation with formation of separate emulsions of the gilsonite and carbon black and then combining the emulsions. Each of the forgoing examples of lignosulphonate are effective in varying degrees in the practice of this invention.

The preparation of the gilsonite-lignosulphonate dispersion disclosed herein includes a step of grinding the gilsonite and lignosulphonate in water at about room temperature (60-100 degrees F.) for a substantial time period to provide the desired particulate size in the dispersion. It is important to continue the grinding of the mixture until a smooth dispersion is attained, preferably having a reading of 4 or greater on the Hegman Grind Gauge (ASTM method D-1210). Lesser degrees of grinding provide mixtures which do not perform as well as the finer grind but may be useful in some applications, such as automotive undercoating and similar applications in which a thin coating is not needed, such as for wood stains and the like. The precise temperature is not critical, but it is unnecessary to use the elevated temperatures taught in the prior art to form the emulsion of this invention. Approximately two parts of gilsonite and two parts of water are combined with 1 to 1.2 parts lignosulphonate in an appropriate pebble mill and allowed to grind for eight to eleven hours. The time for complete dispersion will depend on the quantity of pebbles, the particular lignosulphonate used and the air temperature. The dispersion is adequate when it reaches a reading of approximately four on the Hegman gauge using the procedure of ASTM D-1210.

Once the lignosulphonate and gilsonite have been thoroughly blended, an acrylic emulsion such as Rhoplex AC-388 is mixed with the gilsonite-lignosulphonate blend. Where viscosity characteristics and homogeneity as well as stability of the final gilsonite emulsion product are important, the step of adding the acrylic emulsion to the base stock is important since omission thereof will permit the formation of a thick skin on the product after storage for a substantial time without agitation. The acrylic polymer emulsion may be present in the range of 5-20% by weight, or about 10-30% of the base stock composition. As may be seen from these ranges, suitable embodiments of the emulsion include at least 5% by weight of an acrylic polymer emulsion, and suitably mo more than about 30% by weight.

The many well known applications for gilsonite may find substantial improvement in preparation and application through the use of the emulsion technology and compositions taught herein. For example, gilsonite used as an asphalt additive to make high stability pavements can be substantially improved by the use of the gilsonite-lignosulphonate emulsion of this invention. Such asphalt modification will make asphalt emulsion sealers more stable, have better appearance and provide better rut resistance, especially in hot weather and provide improved weather resistance characteristics. Also, some heat sensitive emulsions which exhibit reduced scuff resistance in hot weather can be replaced with the gilsonite-lignosulphonate compositions of this invention to create a substantially tougher film and provide superior scuff resistance.

A gilsonite-lignosulphonate emulsion may be added to oil drilling cement slurries to further enhance compressive strength shale stabilization, the sealing of micro fractures and other improvements in the properties of the resulting oil drilling cement slurry. The gilsonite-lignosulphonate emulsion will more readily wet the cement slurry and create a more homogeneous relationship between the gilsonite and cement than is encountered by simply adding dry gilsonite to the slurry.

Adhesives formed using the gilsonite-lignosulphonate aqueous emulsion provide enhanced shear and peel strength in the resulting adhesive emulsions and similar adhesives made with water reducible resins. The improved ability to mix the emulsions with the resins provides further inducement to utilize the gilsonite-lignosulphonate emulsions in this application.

The emulsions of this invention fall within the following compositions:

| Ingredient | Preferred Range | Most Preferred Range | Preferred Embodiment |
|---|---|---|---|
| Gilsonite | 1-15% | 5-10% | 8% |
| Carbon Black | 0-40 | 20-35 | 23 |
| Lignosulfonate A | 0.01-5 | 0.01-1 | .0125 |
| Lignosulfonate B | 0.01-5 | 0.01-1 | .0125 |
| Water | 25-60 | 30-60 | 58 |

In accordance with some preferred embodiments of this invention, the aqueous dispersion comprise a blend of gilsonite that is present in amounts up to 25% by weight, carbon block up to 25% by weight, 0.01 to 10of a first water soluble salt of lignosulphonic acid to emulsify the gilsonite, and 0.01 to 10% of a second water soluble salt of lignosulphonic acid to emulsify the carbon black, and 25 to 50% water.

EXAMPLE 1

By way of example, a mixture of 2000 pounds gilsonite (228 gallons) is combined with 2000 pounds of water (83.3 gallons) and 1120 pounds (26 gallons) VANISPERSE brand sodium lignosulphonate (Borregaard Industries Ltd., Lignin Section, P.O. Box 162, N-1701, Sarpsborg, Norway).

The above materials were combined in a pebble mill of about 66 inches in diameter and a width of 114 inches having an interior volume of about 225 cubic feet. The mill contains about 11,200 pounds of pebbles. The mill was then operated for about eight hours or until the dispersion reached four on a Hegman Grind Gauge (ASTM method D-1210). Five hundred pounds (58.6 gallons) of an aqueous acrylic polymer emulsion manufactured by Rohm & Haas Company under the trademark Rhoplex AC-388 was then thoroughly dispersed throughout the gilsonite-sodium lignosulphonate dispersion by stirring the emulsion into the gilsonite-lignosulphonate dispersion in a large mixing tank. The stirring is accomplished with a Cowles dissolver for approximately 20 minutes. The resulting finished product is brown in color, liquid, and has a consistency measured by a Krebs Stomer of between 65 and 80 Krebs units, measured according to the procedure set forth in ASTM D 562. The product has excellent stability when packaged in small containers.

EXAMPLE 2

The product produced above was then mixed with a water dispersable urethane resin to form a highly abrasion resistant, flexible and fast-drying wood stain. The resulting product provides a rich brown appearance to wood and superior weather protection. A typical formulation for the wood stain is as follows:

| URETHANE WOOD STAIN | | |
|---|---|---|
| Lbs. | Gal. | Material |
| 247.2 | 28.25 | SPENSOL L52[1] |

-continued

| URETHANE WOOD STAIN | | |
|---|---|---|
| Lbs. | Gal. | Material |
| 1.8 | 0.24 | Ammonium hydroxide |
| 0.3 | 0.04 | DeeFo PI-3[2] |
| 3.7 | 0.47 | Surfynol 104H[3] |
| 23.5 | 1.28 | Flatting Agent TS100[4] |
| 276.5 | 30.28 | |

Disperse at high speed for 15 to 20 minutes then add the following:

| 542.6 | 62.01 | SPENSOL L52[1] |
|---|---|---|
| 15.4 | 1.88 | Michem Emulsion 737[5] |
| 59.4 | 5.83 | Gilsonite emulsion from Example 1 |
| 893.9 | 100.00 | |
| | | ANALYSIS |
| 4.5 | | Pigment volume concentration, percent |
| 0.08/1.00 | | Pigment/binder ratio |
| 34.0 | | Percent non-volatile, weight |
| 28.7 | | Percent non-volatile, volume |
| 20–25 | | Viscosity, Zahn #2, seconds |
| 8.0 | | Pounds/gallon |
| 0.0 | | VOC (excluding water) |
| 2.6 | | Pounds/gallon |
| 313 | | Grams/liter |

EXAMPLE 3

The product produced in Example 1 was then mixed into a urethane and acrylic system to form a urethane/acrylic wood stain having good abrasion resistance, excellent flexibility and fast-drying characteristics at a somewhat reduced cost from the stain formed in Example 2. A typical formulation for this urethane/acrylic stain is as follows:

| URETHANE/ACRYLIC WOOD STAIN | | |
|---|---|---|
| Lbs. | Gals. | Material |
| 288.3 | 32.95 | SPENSOL L52[1] |
| 2.1 | 0.27 | Ammonium hydroxide |
| 0.3 | 0.04 | DeeFo PI-3[2] |
| 4.3 | 0.55 | Surfynol 104H[3] |
| 27.5 | 1.50 | Flatting agent TS100[4] |
| 322.5 | 35.31 | |

Disperse at high speed for 15 to 20 minutes then add the following:

| 178.1 | 20.35 | SPENSOL L52[1] |
|---|---|---|
| 311.0 | 35.34 | AROLON 860-w-45[6] |
| 18.0 | 2.20 | Michem Emulsion 737[5] |
| 69.2 | 6.80 | Gilsonite emulsion from Example 1 |
| 898.8 | 100.00 | |
| | | ANALYSIS |
| 4.3 | | Pigment volume concentration, percent |
| 0.08/1.00 | | Pigment binder ratio |
| 39.8 | | Percent non-volatile, weight |
| 34.8 | | Percent non-volatile, volume |
| 25–30 | | Viscosity, Zahn #2, seconds |
| 9.0 | | Pounds/gallon |
| 0.0 | | VOC (excluding water) |
| 1.5 | | Pounds/gallon |
| 183 | | Grams/liter |

EXAMPLE 4

The product produced in Example 1 was mixed with a processed linseed oil to form a preservative type wood stain. A typical formulation for this stain is as follows:

| WOOD STAIN AND PRESERVATIVE | | |
|---|---|---|
| Lbs. | Gals. | Material |
| 161.0 | 19.40 | KELSOL 3931-WG4-49[7] |
| 7.3 | 0.97 | 2-Butoxy ethanol |
| 1.8 | 0.24 | Ammonium hydroxide |
| 24.3 | 1.45 | Syloid 234[8] |
| 194.4 | 22.06 | |

Disperse the above materials at high speed for 15–20 minutes then add the following:

| 27.8 | 3.39 | Michem Emulsion 743[5] |
|---|---|---|
| 201.2 | 24.25 | KELSOL 3931-WG4-49[7] |
| 6.2 | 0.73 | Manganese Hydrocure II[9] |
| 21.9 | 2.91 | 2-Butoxy ethanol |
| 2.2 | 0.24 | Aerosol OT-75[10] |
| 9.3 | 0.97 | Polyphase AF1[11] |
| 1.8 | 0.24 | Ammonium hydroxide |
| 347.4 | 41.70 | Water |
| 35.7 | 3.51 | Gilsonite emulsion from Example 1 |
| 847.9 | 100.00 | |
| | | ANALYSIS |
| 26.7 | | Percent solids, weight |
| 24.3 | | Percent solids, volume |
| 30–35 | | Pound/gallon |
| 0.0 | | VOC (excluding water) |
| 2.2 | | Pounds/gallon |
| 267 | | Grams/liter |

[1]A water dispersable urethane resin produced by Reichold Chemicals, Inc. Buffalo, NY 14225.
[2]DeeFo PI-3, a anti-foam defoamer produced by Ultra Additives, Inc., 460 Straight St., Park Station, P.O. Box 98, Patterson, NJ 07543-0098.
[3]Surfynol, a surfactant produced by Air Products & Chemicals, Inc., Allentown, PA.
[4]Flatting Agent TS100 produced by Degussa, Pigment Products Division, 65 Challenge Road, Ridgefield Park, IL 07660.
[5]Michem Emulsion 737, a paraffin wax emulsion produced by Michelman Chemicals, Inc., 9089 Shell Road, Cincinnati, OH 45236.
[6]Arolon 860-w-45, an acrylic emulsion produced by Reichold Chemicals, Inc.
[7]Kelsol 3931-WG4-49, modified linseed oil produced by Reichold Chemicals, Inc.
[8]Syloid 234, flatting agent produced by W. R. Grace Chemical Division, 10 East Baltimore St., P.O. Box 2117, Baltimore, MD 21203.
[9]Manganese Hydrocure II, a catalyst to promote drying manufactured by Mooney Chemicals.
[10]Aerosol OT-75, anionic surfactant produced by Amereican Cyanamide Co., Chemicals Group, Cyanamide Plaza, Wayne, NJ 07470.
[11]Troysan Polyphase AF1, a surfactant produced by Troy Chemical, 1 Avenue L, Newark, NJ 07105-3895.

EXAMPLE 5

An emulsion was formed as described with respect to Example 1 but with the addition of carbon black to enhance opacity and other characteristics of the emulsion, particularly for use as printing inks and stains. The following ingredients were combined in the ball mill:

| MATERIAL | POUNDS |
|---|---|
| Carbon Black (rubber grade, N 326) | 1933 |
| Gilsonite | 645.5 |
| Lignosulphonate (VANISPERSE CB) | 98.25 |
| Lignosulphonate (LIGNOSITE 823) | 98.25 |
| Ammonium Hydroxide (as stabilizer) | 7.5 (dry equivalent) |
| Calcium Carbonate (water ground) | 283.5 |
| Barytes (barium sulphate) | 283.5 |
| Water | 4645 |
| Biocide | 8.0 |

There are two lignins employed, because the Vanisperse is more effective with the carbon black, while the Lignosite is needed to emulsify the gilsonite. It has been observed that the Vanisperse does emulsify the gilsonite alone, but in the presence of the carbon black, it is ineffective. Lignosite cannot effectively disperse the carbon black when used alone. The combination of lignosulphonates is found to effectively disperse both the gilsonite and carbon black in a stable emulsion.

EXAMPLE 6

An attempt was made to emulsify gilsonite using waste sulfite liquor in comparison with the refined calcium lignosulfonate found to be successful in this invention. Unrefined waste sulfite liquor was obtained from Lignotech USA, Inc. The material was identified by its common name of calcium lignosulfonate, shipped as Lignin Liquor-Class 55 and had the following reported physical data:

| | |
|---|---|
| Physical state | brown liquid |
| Boiling point | 104° C. |
| Feezing point | −2° C. |
| Vapor pressure (MMHg) | 14.2 @ 20° C. |
| Vapor density (air = 1) | 1.21 @ 20° C. |
| % volatile by weight | 50 (water) |
| Specific gravity | 1.2510 |
| pH (3% solution) | 3.2 |
| Solubility in water | 100% |

Borresperse, CA was used as a comparison with the unrefined waste sulfite liquor. Identical tests were conducted using the procedures outlined in Example 1 on the following constituents:

| Material | Test 1 | Test 2 |
|---|---|---|
| Gilsonite | 400 pounds | 400 pounds |
| Waste sulfite liquor (50% solids) | 448 pounds | 0 pounds |
| Borresperse, CA | 0 | 224 |
| Water | 176 | 400 |
| Total weight | 1024 | 1024 |

The gilsonite failed to be dispersed in test 1 using the waste liquor. Test 2 resulted in a product closely resembling that produced in Example 1 above which had good shelf life and was thoroughly dispersed with no separation observable.

In compliance with the statute, the invention has been described in language more or less specific as to its compositions and formulations. It is to be understood, however, that the invention is not limited to the specific compositions and formulations mentioned since the compositions and formulations disclosed comprise a preferred form of putting the invention into effect. The invention is, therefore, claimed in any of its forms or modifications within the legitimate and valid scope of the appended claims, appropriately interpreted in accordance with the doctrine of equivalents.

I claim:

1. A method of preparing an aqueous gilsonite dispersion base stock composition prepared by the steps of:
   forming a blend of gilsonite and a water soluble salt of lignosulphonic acids having a gilsonite:water soluble salt of lignosulphonic acids ratio of between 3:1 and 1:1, by weight, respectively by mixing said gilsonite and said water soluble salt of lignosulphonic acids with water to a smooth dispersion; and
   mixing between about 10% and about 30%, by weight, based on said blend, of an acrylic polymer emulsion with said blend to form said base stock.

2. The method of preparing the base stock composition of claim 1 wherein said water soluble salt of lignosulphonic acid is chosen from the group consisting of anionic oxylignins, lignosulphonates and mixtures thereof.

3. The composition of claim 1 wherein said base stock composition is a stable dispersion having a Hegman gauge dispersion of at least four.

4. The composition of claim 1 wherein said base stock has a stable consistency after mixing in said acrylic polymer emulsion of between 65 and 80 Krebs units.

5. The method of claim 2 wherein said water soluble salt of lignosulphonic acid is calcium lignosulphonate.

6. The method of claim 2 wherein said water soluble salt of lignosulphonic acid is sodium lignosulphonate.

7. The method of claim 2 wherein said water soluble salt of lignosulphonic acid is ammonium lignosulphonate.

8. The method of claim 2 wherein said water soluble salt of lignosulphonic acid is an oxylignin, a major fraction thereof having a molecular weight in the range of 1,000 to 15,000.

9. The method of claim 1 and the further step of diluting said base stock composition with water to form a wood stain.

10. A composition comprising a stable liquid emulsion of gilsonite, water, and an emulsifying agent consisting essentially of an anionic emulsifier comprising a water soluble refined anionic salt of lignosulphonic acid refined to increase phenolic hydroxyl and carboxylic groups, the gilsonite and lignosulphonic acid being present in a sufficient amount to form a stable liquid gilsonite emulsion base stock that maintains an homogeneous liquid phase during storage and is capable of subsequent homogeneous incorporation into liquid compositions into which gilsonite is introduced.

11. The composition of claim 10 further including an acrylic polymer emulsion present in the range of 5–20% by weight.

12. The composition of claim 10 having a dispersion rating of at least four of the Hegman Grind Gauge.

13. The composition of claim 10 wherein said water soluble salt of lignosulphonic acid is selected from the group consisting of refined sodium, calcium, and ammonium lignosulphonates, oxylignins and mixtures thereof.

14. The composition of claim 13 wherein said water soluble salt of lignosulphonic acid is an oxylignin, a major fraction thereof having a molecular weight in the range of 1,000 to 15,000.

15. The composition of claim 10 wherein said dispersion is formed at a temperature in the range of 50° to 120° F.

16. The composition of claim 11 further diluted with water to a level of 30 to 80% by weight of water.

17. The composition of claim 10 formed by grinding said ingredients in a mill at a temperature below 100 degrees F.

18. An aqueous dispersion comprising a blend of gilsonite that is present in amounts up to 25% by eight, carbon black up to 25% by weight, 0.01 to 10% of a first water soluble salt of lignosulphonic acid to emulsify said gilsonite, 0.01 to 10% of a second water soluble salt of lignosulphonic acid to emulsify said carbon black, and 25 to 50% water.

19. The composition of claim 11 further including carbon black and a sodium lignosulphonate compatible therewith to form a smooth emulsion.

20. The composition of claim 18 where said first and second water soluble salts of lignosulphonic acid are sodium lignosulphonates.

21. A composition comprising an anionic stable emulsion of gilsonite and an anionic refined water soluble salt of lignosulphonic acid refined to increase phenolic hydroxyl groups and carboxylic groups, the gilsonite and refined lignosulphonic acid being present in sufficient amounts to form an homogenous emulsion of solubilized gilsonite that is capable of storage as a base stock, and subsequent homogenous incorporation into wood stain, printing ink, cement slurry, and asphalt mixtures.

22. The composition of claim 21 wherein the homogenous emulsion further comprises a sufficient amount of an acrylic polymer emulsion to enhance homogenous incorporation of the emulsion into wood stain, printing ink, cement slurry, and asphalt mixtures.

23. The composition of claim 21, wherein the emulsion has a Hegman dispersion rating of at least about four.

24. The composition of claim 22 wherein the emulsion has a stable consistency of about 65-80 Krebs units.

25. An aqueous emulsion formed by mixing gilsonite, water and an anionic refined water soluble salt of lignosulphonic acid refined to increase phenolic hydroxyl groups and carboxylic groups, the gilsonite and refined lignosulphonic acid being present in sufficient amounts, without external application of heat, to form an homogenous emulsion of the gilsonite, the salt of lignosulphonic acid, and water.

26. A gilsonite base stock composition comprising gilsonite, water and an anionic, refined, water soluble salt of lignosulphonic acid refined to increase phenolic hydroxyl groups and carboxylic groups, the gilsonite and refined lignosulphonic acid being present in sufficient amounts to form a stable liquid dispersion of gilsonite that maintains a Hegman gauge dispersion of at least four when the base stock is stored in a container.

27. A wood stain incorporating the composition of claim 10.

28. A wood product coated with the wood stain of claim 27.

29. An homogenous emulsion of gilsonite and a second solid, comprising:
a sufficient emulsifying amount of a first water soluble salt of lignosulphonic acid that is capable of forming a stable homogenous emulsion of gilsonite;
a sufficient emulsifying amount of a second water soluble salt of lignosulphonic acid that is capable of forming a stable homogenous emulsion with the second solid.

30. The homogenous emulsion of claim 29 wherein the second solid is carbon black.

31. Printing ink comprising the homogenous emulsion of claim 30.

32. A gilsonite base stock composition consisting essentially of an aqueous liquid emulsion of gilsonite, water, and a water soluble salt of lignosulphonic acid that has been refined to increase phenolic hydroxyl groups and carboxylic groups and that emulsifies the gilsonite.

33. A composition comprising an anionic homogenous aqueous dispersion containing by weight, about 35-40% gilsonite, about 35-40% water, and about 20-30% of an anionic, water soluble salt of lignosulphonate refined to increase phenolic hydroxyl groups and that is capable of emulsifying the gilsonite.

34. A base stock composition consisting essentially of an aqueous liquid emulsion of gilsonite, water, a water soluble salt of lignosulphonic acid and an acrylic polymer emulsion.

35. The back stock composition of claim 34 wherein the acrylic polymer emulsion is, by weight, about 10 to 30% of the base stock composition.

36. The base stock composition of claim 35 wherein the gilsonite and lignosulphonic acid are present in a weight ratio of about 3:1 to 1:1.

37. The composition of claim 36, further comprising at least 5% by weight of an acrylic polymer emulsion.

38. The composition of claim 37, wherein there is no more than about 30% by weight of the acrylic polymer emulsion.

39. A method of preparing an aqueous liquid gilsonite base stock composition, comprising the step of:
blending sufficient amounts of gilsonite, water, and an emulsifying water soluble salt of lignosulphonic acid that has been refined to increase free phenolic hydroxyls and carboxylic groups to form an homogenous stable emulsion without external application of heat.

40. The method of claim 39 wherein the blending step occurs in a pebble mill.

41. The composition of claim 39 further comprising the step of blending an acrylic polymer emulsion with the gilsonite, the water soluble salt, and the water.

42. The composition of claim 39 wherein the gilsonite and the water soluble salt of lignosulphonic acid are blended in a weight ratio of between about 3:1 to 1:1.

43. The method of claim 41 wherein the acrylic polymer emulsion is blended in an amount of at least 5% by weight.

44. An aqueous emulsion formed by mixing gilsonite, water and an anionic refined water soluble salt of lignosulphonic acid in sufficient amounts to form an homogenous emulsion of the gilsonite, the salt of lignosulphonic acid, and water.

45. The emulsion of claim 25 wherein the emulsion of solubilized gilsonite is capable of storage as a base stock, and subsequent homogenous incorporation into wood stain, printing ink, cement slurry and asphalt mixtures.

46. The composition of claim 44 wherein the aqueous emulsion is formed without external application of heat.

47. A composition comprising a stable liquid emulsion of gilsonite, water and an emulsifying agent consisting essentially of an anionic emulsifier comprising a water soluble refined anionic salt of lignosulphonic acid in a sufficient amount to form a stable liquid gilsonite emulsion base stock that maintains an homogenous liquid phase during storage and is capable of subsequent homogenous incorporation into liquid composition into which gilsonite is introduced.

48. The composition of claim 47 wherein the composition consists essentially of gilsonite, water, and the water soluble refined anionic salt of lignosulphonic acid.

* * * * *

UNITED STATES PATENT AND TRADEMARK OFFICE
CERTIFICATE OF CORRECTION

PATENT NO. : 5,274,014

DATED : December 28, 1993

INVENTOR(S) : Albert G. Silverton

It is certified that error appears in the above-identified patent and that said Letters Patent is hereby corrected as shown below:

Column 3, lines 19-20, "LIGNOSRM 823" should read --LIGNOSITE 823--.

Column 3, line 65, "on e " should read --one--.

Column 5, line 43, "mo" should read --no--.

Column 6, line 23, "10of" should read --10% of --.

Column 11, line 55, "sold" should read --solid--.

Signed and Sealed this

Eleventh Day of April, 1995

Attest:

BRUCE LEHMAN

Attesting Officer

Commissioner of Patents and Trademarks